United States Patent
Cimini, Jr. et al.

(10) Patent No.: US 6,891,792 B1
(45) Date of Patent: May 10, 2005

(54) METHOD FOR ESTIMATING TIME AND FREQUENCY OFFSET IN AN OFDM SYSTEM

(75) Inventors: Leonard Joseph Cimini, Jr., Howell, NJ (US); Bruce Edwin McNair, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/311,562

(22) Filed: May 14, 1999

(51) Int. Cl.[7] .......................... H04J 3/06; H04J 11/00; H04L 27/28

(52) U.S. Cl. ................. 370/206; 370/210; 370/503; 375/260; 375/280; 375/346; 375/362

(58) Field of Search ................. 370/203, 204, 370/206, 208, 210, 503, 509, 516; 375/260, 261, 267, 271, 279, 280, 329, 331, 338, 346, 347, 355, 359, 362, 371

(56) References Cited

U.S. PATENT DOCUMENTS

| | | | | |
|---|---|---|---|---|
| 5,596,582 A | * | 1/1997 | Sato et al. | 370/509 |
| 5,946,292 A | * | 8/1999 | Tsujishita et al. | 370/204 |
| 5,953,311 A | * | 9/1999 | Davies et al. | 370/210 |
| 6,058,101 A | * | 5/2000 | Huang et al. | 370/208 |
| 6,269,132 B1 | * | 7/2001 | Yonge, III | 375/346 |
| 6,381,251 B1 | * | 4/2002 | Sano et al. | 370/480 |
| 6,396,803 B2 | * | 5/2002 | Hornsby et al. | 370/208 |

OTHER PUBLICATIONS

Timothy M. Schmidl and Donald C. Cox, "Robust Frequency and Timing Synchronization for OFDM," IEEE Transactions on Communications, vol. 45, No. 12, Dec. 1997, pp. 1613–1621.

Thierry Pollet et al., "BER Sensitivity of OFDM systems to Carrier Frequency Offset and Wiener Phase Noise," IEEE Transactions on Communications, vol. 43, No. 2/3/4, Feb./Mar./Apr. 1995; pp. 191–193.

Paul H. Moose, "A Technique for Orthogonal Frequency Division Multiplexing Frequency Offset Correction," IEEE Transactions on Communications, Vo. 42, No. 10, Oct. 1994, pp. 2908–2914.

Timothy M. Schmidl and Donald C. Cox, "Low–Overhead, Low–Complexity [Burst] Synchronization for OFDM", Proc. ICC, Jun. 1996, pp. 1301–1306.

J.–J. Van De Beek, et al., "Low Complex Frame Synchronization in OFDM Systems," Proc. ICUPC, Nov. 1995, pp. 982–986.

Laszlo Hazy and Mohammed El–Tanany, "Synchronization of OFDM Systems Over Frequency Selective Fading Channels," 1997 IEEE 47th Vehicular Technology Conference, Phoenix, AZ, May 4–7, 1997; pp. 2094–2098.

(Continued)

*Primary Examiner*—Alpus H. Hsu

(57) ABSTRACT

The synchronization technique invention uses inherent characteristics of the frequency domain representation of the data symbols. By computing a differential-in-frequency function across a large number of OFDM tones, robust estimates of time and frequency offset can be easily obtained. The technique also allows the system designer to directly trade performance in the presence of channel impairments against signal processing complexity. Analysis and simulation have shown good performance in the presence of noise and channel delay dispersion, impairments that are the harshest in a wireless environment.

Prior techniques for OFDM synchronization have focussed on the time domain representation of the signal. Those that have recognized the translation of time and frequency offset to the frequency domain have not considered the systematic modification of the signal by the offsets.

21 Claims, 7 Drawing Sheets

OTHER PUBLICATIONS

Thierry Pollet et al, "The BER Performance of OFDM Systems Using Non–Synchronized Sampling," *Proc. Globecom,* Nov. 1994, pp. 253–257.

Ji Sung Oh et al., "A Carrier Synchronization Technique for OFDM on the Frequency–Selective Fading Environment," 1996 IEEE 46$^{th}$ Vehicular Technology Conference, Atlanta, GA, Apr. 28–May 1, 1996; pp. 1574–1578.

William D. Warner et al., "OFDM/FM Frame Synchronization for Mobile Radio Data Communication," IEEE Transactions on Vehicular Technology, vol. 42, No. 3, Aug. 1993, pp. 302–313.

J–J Van De Beek, et al., "ML Estimation of Time and Frequency Offset in OFDM Systems," IEEE Transactions on Signal Processing, vol. 45, No. 7, Jul. 1997; pp. 1800–1805.

Flavio Daffara and Antoine Chouly, "Maximum Likelihood Frequency Detectors for Orthogonal Multicarrier Systems," IEEE International Conference on Communications '93, May 23–26, 1993, Geneva, pp. 766–771.

Hiroshi Nogami et al., "A Frequency and Timing Period Acquisition Technique for OFDM Systems," The Sixth IEEE International Symposium on Personal, Indoor and Mobile Radio Communications, PIMRC'95, Sep. 27–29, 1995, Toronto, pp. 1010–1015.

T. Keller et al., "Orthogonal Frequency Division Multiplex Synchronization Techniques for Wireless Local Area Networks," PIMRC'96, Oct. 15–18, 1996, Taipei, Taiwan, pp. 963–967.

Minoru Okada et al., "Optimum Synchronization of Orthogonal Multi–Carrier Modulated Signals," PIMRC'96, Oct. 15–18, 1996, Taipei, Taiwan, pp. 863–867.

Masato Mizoguchi, et al., "A Fast Burst Synchronization Scheme for OFDM," IEEE 1998 International Conference on Universal Personal Communications (ICUPC '98), Oct. 5–9, 1998, Florence, Italy, pp. 125–129.

Flavio Daffara and Ottavio Adami, "A New Frequency Detector for Orthogonal Mutlicarrier Transmission Techniques," 1995 IEEE 45$^{th}$ Vehicular Technology Conference, Jul. 25–28, 1995, Chicago, Illinois, pp. 804–809.

Ferdinand Classen and Heinrich Meyr, "Frequency Synchronization Algorithms for OFDM Systems Suitable for Communication over Frequency Selective Fading Channels," VTC 1994, 1994 IEEE 44$^{th}$ Vehicular Technology Conference, Jun. 8–10, 1994, Stockholm, pp. 1655–1659.

Uwe Lambrette, et al., "OFDM Burst Frequency Synchronization by Single Carrier Training Data," IEEE Communications Letters, vol. 1, No. 2, Mar. 1997, pp. 46–48.

Keon Woo Kang et al., "Decision–Directed Maximum–Likelihood Estimation of OFDM Frame Synchronization Offset," Electronics Letters, Dec. 8, 1994, vol. 30, No. 25, pp. 2153–2154.

Marco Luise and Ruggero Reggiannini, "Carrier Frequency Acquisition and Tracking for OFDM Systems," IEEE Transactions on Communications, vol. 44, No. 11, Nov. 1996, pp. 1590–1598.

Michael Speth, et al., "Minimum Overhead Burst Synchronization for OFDM Based Broadband Transmission," IEEE Globecom 1998, Conference Record—vol. 5 of 6, Nov. 8–12, 1998, Sydney, pp. 2777–2782.

Rohit Negi and John Cioffi, "Blind OFDM Symbol Synchronization in ISI Channels," IEEE Globecom 1998, Conference Record—vol. 5 of 6, Nov. 8–12, 1998, pp. 2812–2817.

* cited by examiner

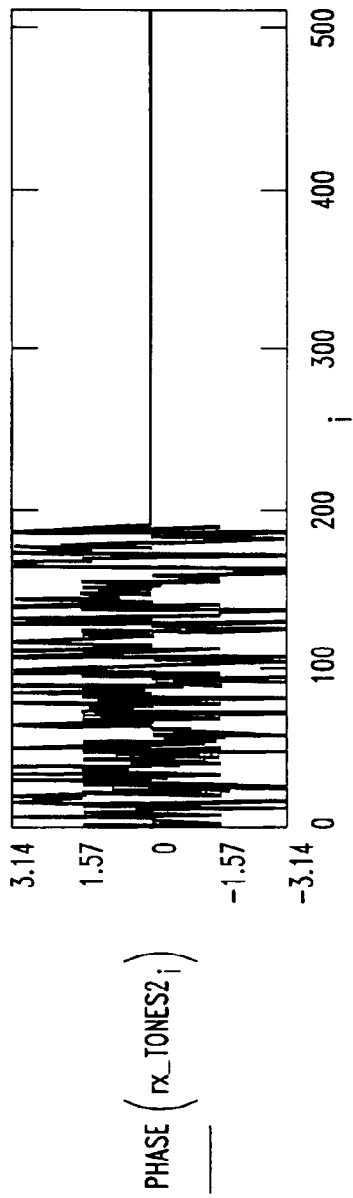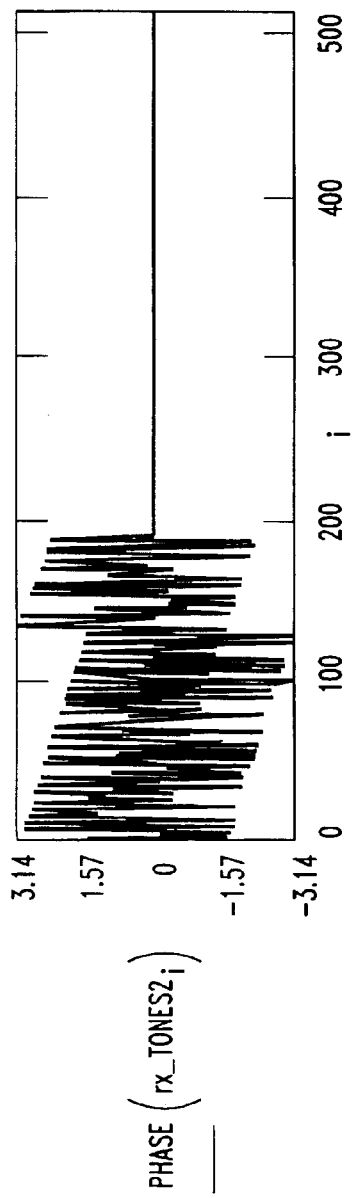

METHOD FOR ESTIMATING TIME AND FREQUENCY OFFSET IN AN OFDM SYSTEM

This patent application is related to U.S. Ser. No. 09/128,738 filed Aug. 5, 1998 by Alamouti, Stolarz, & Becker entitled "Vertical Antenna Adaptive Array", and U.S. Ser. No. 08/796,584 by Alamouti et al., entitled "Method for Frequency Division Duplex Communications," assigned to AT&T Wireless Services and incorporated herein by reference.

FIELD OF THE INVENTION

The invention relates to a method to synchronize a multicarrier transmission system.

BACKGROUND OF THE INVENTION

Synchronization techniques for OFDM have been extensively studied: obtaining good performance under a variety of channel conditions with minimal signal processing is challenging. A good OFDM synchronization technique will be applicable to more than the wireless high speed data communications system currently being studied—OFDM is being used or being considered in a variety of LEC networks in the form of ADSL, in Digital Audio Broadcast systems, in cable modems, and in digital television systems. OFDM is a special case of multicarrier transmission systems. The techniques described herein are generally applicable to other forms of multicarrier systems, e.g., discrete multitone (DMT) systems.

SUMMARY OF THE INVENTION

The invention uses inherent characteristics of the frequency domain representation of the data symbols. By computing a differential-in-frequency function across a large number of OFDM tones, robust estimates of time and frequency offset can be easily obtained. The technique also allows the system designer to directly trade performance in the presence of channel impairments against signal processing complexity. Analysis and simulation have shown good performance in the presence of noise and channel delay dispersion, impairments that are the harshest in a wireless environment.

Prior techniques for OFDM synchronization have focussed on the time domain representation of the signal. Those that have recognized the translation of time and frequency offset to the frequency domain have apparently not considered the systematic modification of the signal by the offsets.

BRIEF DESCRIPTION OF THE FIGURES

FIG. 4 depicts a plot of phase vs. tone number, no timing offset.

FIG. 5 depicts a plot of phase vs. tone number, 1 sample timing offset.

DISCUSSION OF THE PREFERRED EMBODIMENT

I. Introduction

The problem of joint timing and frequency offset estimation is critical for the proper operation of a digital transmission system. It is also a difficult problem when it comes to system implementation. The problem is compounded by the fact that timing offset may often create similar looking signal impairments to frequency offset. A number of prior studies have attempted to find timing and frequency offset estimation techniques that are robust in the face of a wide variety of impairments present on a wireless channel.

We focus on the problem of joint timing and frequency offset estimation for an OFDM system. We first present a brief overview of an OFDM system. We review prior work in the area and describe our system's requirements as an specific example of OFDM system design. We conclude by showing the performance of the method in the presence of a variety of channel impairments and describing practical limitations of the technique.

II. OFDM Overview

Delay spread, that is the time dispersion of a brief transmitted pulse, is a major impediment to high speed data transmission in the outdoors, high mobility wireless environment. Similarly, signal reflections in the landline telephone copper cable plant or in a TV cable systems coaxial cable plant create similar dispersion and make high speed communications over the local access network difficult. In a wireless system, distant signal reflectors can create several microseconds of delay spread. The high mobility (i.e., high vehicle speeds) environment will create a rapidly changing channel. Adaptive channel equalization techniques have been used to combat some of this effect, but are limited in their ability to deal with large amounts of rapidly changing delay spread, especially when the system is transmitting at the high symbol rates needed to attain high throughput. Conversely, using low symbol rates to mitigate channel dispersion will require dense constellations in single carrier systems. Dense signal constellations will be subject to degradation due to noise, interference, and fading.

Figure 1:
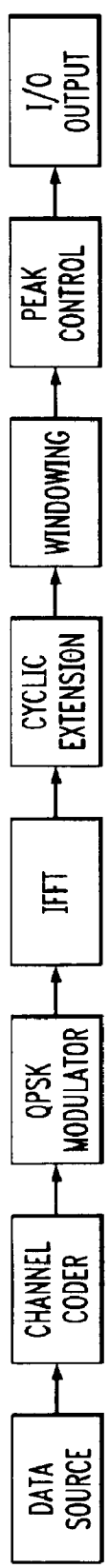
FIG. 1 is a block diagram of OFDM transmitter.

In an OFDM system, a single higher speed bit stream is separated into a multiplicity of slower speed bit streams, each of the slower bit streams used to modulate one of a set of carriers. The carriers are chosen within a single bandwidth and, for an OFDM system, with their inter-tone spacing chosen to insure orthogonality of the resulting combined waveforms. Generic multicarrier systems are not bound by the strict othogonality constraints but, for ease of implementation will often use very similar techniques to the OFDM system described herein. By designing the transmission in this way, the benefit of low symbol rates can be attained without the penalty of dense constellations—each individual carrier has a sparse constellation, often QPSK. The total capacity of the OFDM system is determined by the union of a large number of these individually sparse constellations. Typically, the OFDM transmitter would be implemented by generating a series of complex numbers, representing the phase of the individual tones, and using the Inverse Discrete Fourier Transform (IDFT) to convert the series of tones into a time domain waveform. For practical reasons, in order to make the analog reconstruction and antialiasing filters realizable, the size of the IDFT (or more often the Inverse Fast Fourier Transform (IFFT)) is usually larger than the number of tones. In addition, extra samples are prepended and appended to the transformed waveform. These "cyclic prefix" and "cyclic suffix" samples make the transmitted signal more robust against time dispersion and timing offset—as long as the received signal, plus its various delayed copies, are sampled within the cyclic extension, the constant amplitude of the received spectrum will be preserved. At the transmitter, the summation of a large number of sinusoids can generate a signal with a large peak-to-average waveform. A peak control function is used to minimize this effect, relaxing the requirements on RF amplifier stages. FIG. 1 shows a simplified block diagram of an OFDM transmitter.

Modulated tones occupy only the first group of input tones to the IFFT (about one third of the total number of tones for the OFDM system here). The rest of the IFFT inputs are set to zero, insuring that the output waveform has no signal energy at higher frequencies and thus oversampling the resulting waveform. As stated above, this simplifies the requirement for antialiasing filtering of the final waveform. Besides this oversampling, other redundant information is added to the OFDM waveform—the IFFT waveform samples are cyclically extended both before and after the desired set of samples. For an N point IFFT, the cyclically extended suffix samples are simply copied from the beginning of the waveform as (In the equations here, upper case letters indicate signal representations in the frequency domain. Lower case letters indicate the time domain):

$$x_{i+N} = x_i$$

The cyclic prefix is computed similarly, copying the samples at the end of the waveform to the front of the extended waveform.

Figure 2:
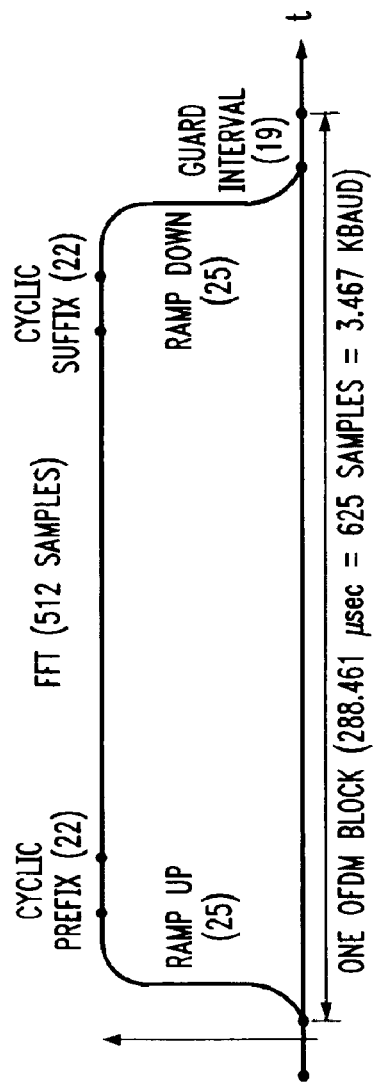
FIG. 2 is an OFDM block structure.

Two other segments that are added to the IFFT waveform are the windowed section and the guard interval. The guard interval is a period during which the transmitted samples are all zero. At the expense of a slightly reduced transmission efficiency, the presence of this guard interval helps to insure that the samples received during a given OFDM block are not contaminated with delayed samples from a previous block. Since the OFDM system described here will be used in packet mode, it is expected that the transmitter will be turned on and off during each OFDM burst. To prevent the radiated signal from "splattering" outside of its assigned channel, "windowing" of the OFDM samples is used. By shaping the transmitter ramp up and ramp down with a raised cosine pulse shape, the system bandwidth is confined to little more than the bandwidth occupied by the set of OFDM tones alone. Windowing also reduces the system's sensitivity to frequency offset and doppler by reducing the amplitude of the interference contribution from adjacent tones. FIG. 2 OFDM block structure illustrates these items and provides the particular parameters used for the system described here.

Figure 3:
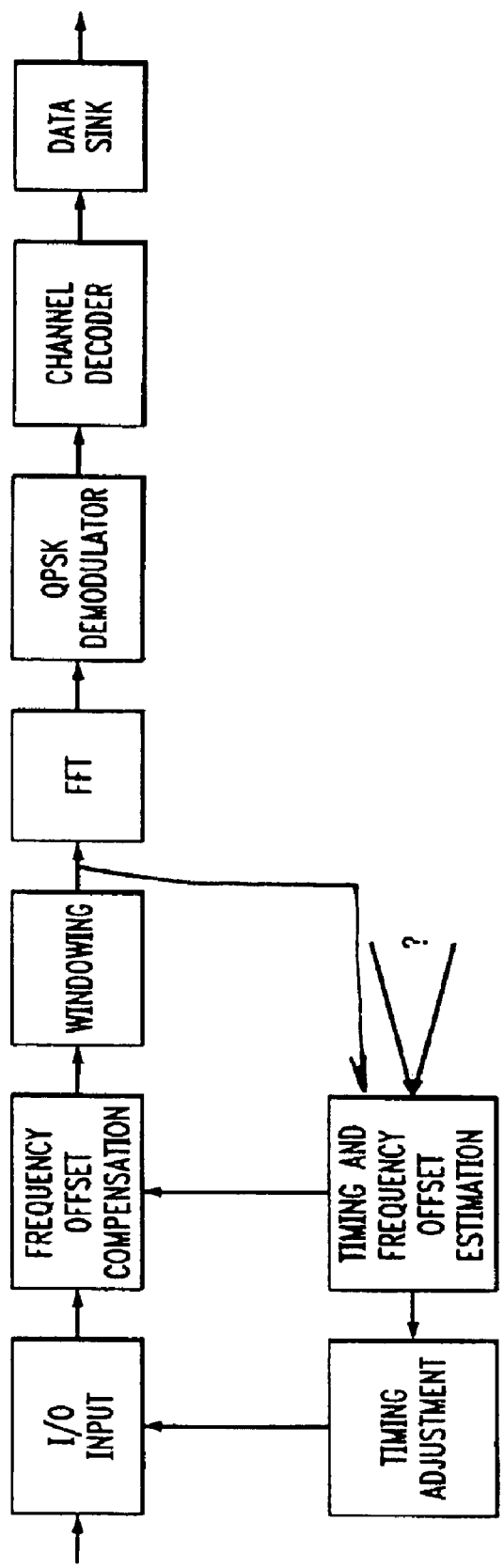
FIG. 3 is a block diagram of OFDM receiver.

The OFDM receiver structure mirrors the operation of the OFDM transmitter. While the technique described here is applicable to a multicast network, that is, a network with one transmitter and several independent receivers, to simplify the description a simple one transmitter, one receiver network is presented. It can readily be seen that each receiver in a multicast network could individually perform the operations described on a common transmitted signal. In the receiver, extra samples are stripped from the received waveform and the resulting waveform is transformed into the frequency domain. Here, assuming that there was no frequency or timing offset in the time domain waveform, a series of tones are processed, with each conveying one of the lower speed bit streams. If QPSK were used at the OFDM transmitter to modulate each tone, then each OFDM tone burst would convey 2 bits of information per tone in the phase of that tone. A simplified OFDM receiver is shown in FIG. 3.

While the relatively long symbol period of the OFDM waveform makes the system resistant to delay spread, incorrect timing phase or frequency offset in the received signal will quickly degrade system performance. Most of the extra samples in the time domain waveform insure that the amplitude of the received OFDM spectrum remains constant in the presence of delay spread and timing offset, due to the cyclic shifting property of the Fourier Transform. However, information is conveyed in the phase of the received tones, so the damaging effects of timing offset must be corrected.

Frequency offset has a different effect on the received waveform. While the OFDM transmitter generated orthogonal tones by creating a specific linear harmonic relationship between all the tones, frequency offset shifts each tone by an equal amount, creating an affine relationship between tone frequencies, thus destroying the linear harmonic structure and creating inter-tone interference. Like inter-symbol interference in a single carrier system, frequency offset allows energy from adjacent tones to "bleed" into a desired tone, reducing system performance.

III. System Parameters

As an example of a practical system, the OFDM system here is intended to provide peak end user data rates of up to 384 kb/s. As shown in FIG. 2, this system transmits OFDM bursts with a duration of 288.462 μsec. The 512 FFT samples represent the transform of 189 discrete complex tones. These 189 tones are spaced every 4.232 kHz (skipping the three tones nearest the center frequency), so the total bandwidth is 812.5 kHz. With QPSK modulation on each complex tone, this means that the raw channel rate is 1.3104 Mb/s. With a rate ½ Reed-Solomon code plus framing and control overhead, the peak end user capacity of 384 kb/s is easily attained.

IV. Prior Work

Schmidtl's and Cox's papers in the IEEE Transactions on Communications and in the Proceedings of the International Communications Conference define techniques for estimating time and frequency offset based on signal processing in the time domain, using 'pilot' signals. While the pilot signals are useful for establishing a reference for calculating synchronization parameters, they require that transmit energy be expended and signal bandwidth be consumed that could have been used to transmit end user information.

Moose's technique similarly requires repetition of an OFDM block, essentially using one of the repetitions as a 'pilot' signal. Frequency offset is computed by comparing samples of the first block to the second in the time domain. This technique is only used for frequency offset estimation. It does not address the need for time synchronization.

The work of Pollet, et. al., describes the degradation in system performance when adequate timing synchronization is not used.

Finally, van der Beek, et. al., describe a timing synchronization technique that relies on inherent redundancy in the OFDM time domain waveform. Because the cyclic extension of the FFT samples are simply ordered copies of other samples in the waveform, this technique relies on computing the time correlation between the repeated samples to estimate the timing offset. [J.-J. van de Beek, M. Sandell, M. Isaksson, and P. Borjesson, "Low-complex frame synchronization in OFDM systems," in Proc. ICUPC, November 1995, pp. 982–986.] There are relatively few cyclically extended samples in the OFDM block, so the robustness to noise may be somewhat limited, processing a single OFDM block.

None of the previous techniques process the signals in the frequency domain as the current scheme does, and none recognize the inherent structure of the frequency domain signals that this scheme relies on. Except for van der Beek's scheme, all require the use of redundant pilot signals.

V. Approach

Frequency offset causes each tone in the OFDM cluster to be shifted in frequency by the same amount. The complex OFDM time domain waveform appears to be rotated on a time-sample by time-sample basis by a continuously rotating phasor. While this effect is instructive to understand how to undo the effect of frequency offset, there is nothing immediately obvious about the time domain waveform that suggests how the frequency offset can be estimated. Timing offset similarly shifts all samples by a fixed time interval which, again by itself, gives little information that allows estimation of the amount of offset when observing the time domain waveform. The current method performs estimation of the time and frequency error in the frequency domain, unlike previous approaches which did their estimation in the time domain. In addition to realizing the other advantages described herein, a frequency domain approach to synchronization simplifies the architecture of the receiver.

Timing Offset Correction

First, consider the effect of timing offset on the OFDM tones. FIG. 4 depicts a plot of the phase versus frequency (here, frequency corresponds to FFT output bin number) for a randomly generated OFDM tone cluster with no timing offset. It can be seen that each tone takes on one of a discrete set of phases (one of four, in this case, since the tones are QPSK modulated). Each tone is independently modulated, so the transitions between the phase of $tone_i$ and $tone_{i+1}$ are random multiples of $\pi/2$. For this, and the subsequent phase plots, the FFT size is 512 and there are 189 active tones.

In contrast, FIG. 5 depicts a plot of phase versus frequency where the OFDM signal has been delayed by one time sample (462 $\mu$sec in the example system). It can be seen that the tone modulation is still present, however, each tone has a phase that is slightly offset from the previous one. As shown in the section of this memo that presents the analysis of the effects of timing offset, this is exactly what is expected.

To understand how timing offset has changed the received signal, first consider an OFDM waveform $x_n$, generated from a series of OFDM tones, $X_m$:

$$x_n = \frac{1}{\sqrt{N}} \cdot \sum_{m=0}^{N-1} X_m \cdot e^{j \frac{2 \cdot \pi \cdot n \cdot m}{N}}$$

At the OFDM receiver, the waveform is assumed to have a timing offset, $\Delta t$. By the shifting property of the Fourier Transform, a time delayed signal in the time domain $$r(t) = x(t - \Delta t)$$

Has as its transform:

$$R(f) = X(f) \cdot e^{-j \cdot 2 \cdot \pi \cdot f \cdot \Delta t}$$

So, as demonstrated in FIG. 5, it can be seen that the time delay has caused a phase rotation in the frequency domain that increases linearly with frequency. Consider how the Discrete Fourier Transform of the sampled receive signal is affected by timing offset:

$$R_n = X_n \cdot e^{j \frac{2 \cdot \pi \cdot n \cdot \Delta t}{N}}$$

For any adjacent pair of tones, $R_i$ and $R_{i+1}$, $$\Delta t = \frac{N}{2 \cdot \pi} \cdot (\arg(R_i) - \arg(R_{i+1}))$$

This suggests an approach that could be used to estimate the amount of timing offset: measure the differential phase from one tone to the next and adjust the sampling point to compensate. It is instructive to note that as shown in FIG. 5 and in the equation above, timing offset has created the same phase difference between every pair of tones: $R_i$ and $R_{i+1}$. This means that, while noise and other impairments may perturb the individual tone phases, there is a systematic change in phase from tone to tone due to timing offset. By estimating timing offset across many or all the adjacent tone pairs in a burst, it is feasible to accurately estimate the timing offset in the presence of a collection of other impairments: frequency offset, noise, fading, delay spread/frequency selective fading, etc. Particular performance results are presented in the next section. Of course, the same inherent characteristics that cause each adjacent pair of tones to exhibit the identical phase difference also cause each tone pair separated by N other tones to exhibit a phase difference that is different than that between adjacent tones, but also identical to all other N tone separated tone pairs. Further, if it is necessary for the receiver to avoid using certain tones for phase estimation, it is possible to account for the missing tones by appropriately scaling the phase differences. Note— for the purposes of this description, the terms 'tone' and 'carrier' are interchangeable, the latter term being preferred for generic multicarrier systems, the former used in the context of OFDM systems.

Two useful characteristics of the algorithm become apparent: (1) that noise effects may be partially or mostly mitigated by the tone-to-tone differential nature of the algorithm and (2) that the essential nature of the algorithm creates a weighting of timing estimates based on the likely validity of each estimate. These observations are explained in greater depth below.

Figure 6:
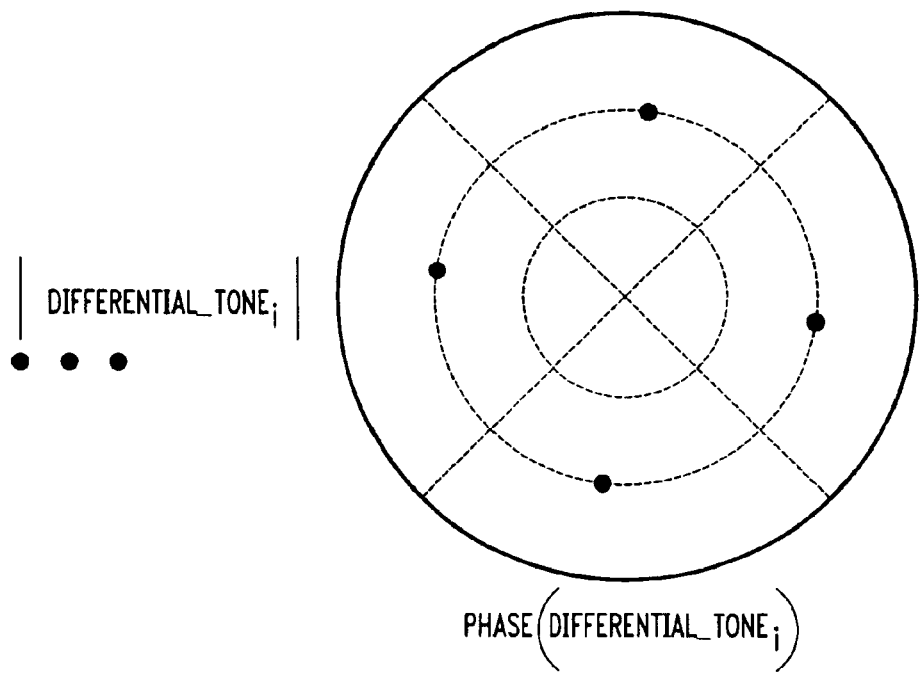
FIG. 6 shows differential in frequency constellation with 10 sample timing offset.
Figure 7:
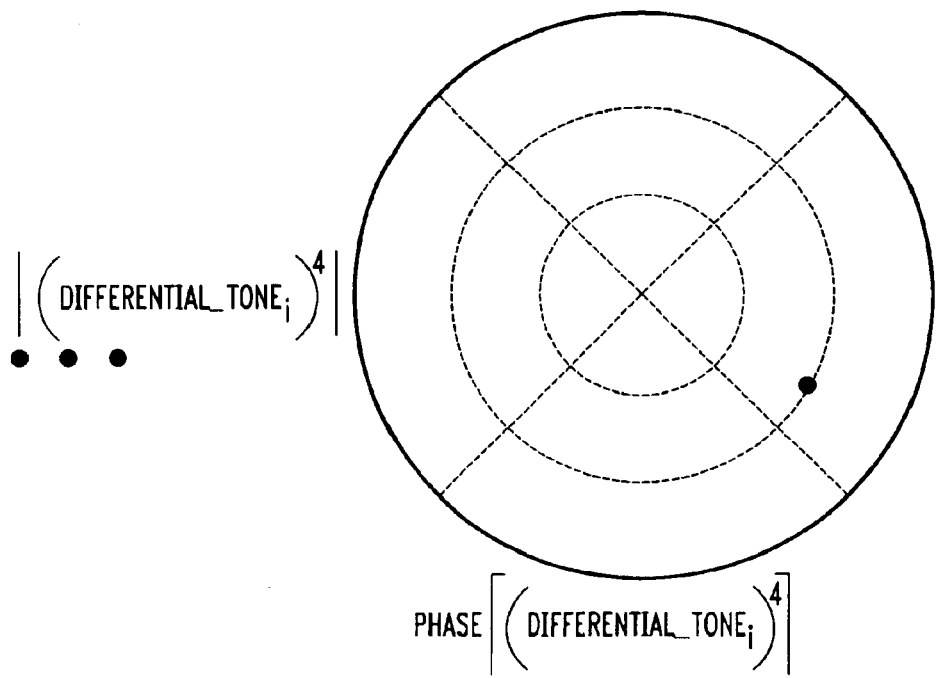
FIG. 7 shows the $4^{th}$ power of differential in frequency constellation.

One may think of the process of estimating timing offset as the differential detection of tone phase from one tone to its neighbor, in frequency. For QPSK, individual tone modulation can be removed from the estimate by raising the differentially detected phase to the $4^{th}$ power. Alternatively, each tone phase could be compared to the transmitted signal constellation and the complex conjugate of the nearest signal used to rotate the signal to the positive real axis. While noise and other impairments will occasionally create incorrect decisions about the transmitted signal and thus the received signal phase, these effects will average out across a number of estimates. As another alternative, if the correct transmitted data sequence were known in advance by the receiver, this information could be used to determine the expected phase of each tone. This information could be used as described to rotate the received signal to the positive real axis. To gain the signal to noise advantage of averaging the tone-to-tone estimates, it is possible to average the phase of each measurement. For N tones in an OFDM block, this approach requires the equivalent of N−1 arctangent calculations, which is prohibitively expensive in a real-time system. A preferred embodiment, which gives better performance under many channel conditions, is to separately average the in-phase and quadrature components of the processed constellation points and calculate the phase of that signal to determine the timing offset correction. FIG. 6 shows the constellation that results after differential-in-frequency detection of the individual tones. FIG. 7 shows the same constellation when each signal point is raised to the $4^{th}$ power. Simulation results show that for reasonable amounts of timing offset, the phase angle of the resultant signal is directly proportional to the timing offset. The proportionality breaks down when the timing offset creates a very large rotation of the estimation signal. As the estimation signal approaches the (−1,0) point in the signal plane, there is an obvious 180 degree phase ambiguity, which could be addressed by processing the received signal instead of the $4^{th}$ power signal. There is an additional degradation in the system performance as the timing offset causes the FFT waveform to wander far outside the cyclic extension region into the windowed section of the data. Neither of these limitations are considered serious, since this timing estimation algorithm in intended to provide a steady state tracking control signal. Coarse initial timing acquisition (to within reasonable fraction of the OFDM block) is sufficient to get this timing recovery algorithm started.

Frequency Offset Correction

Figure 8:
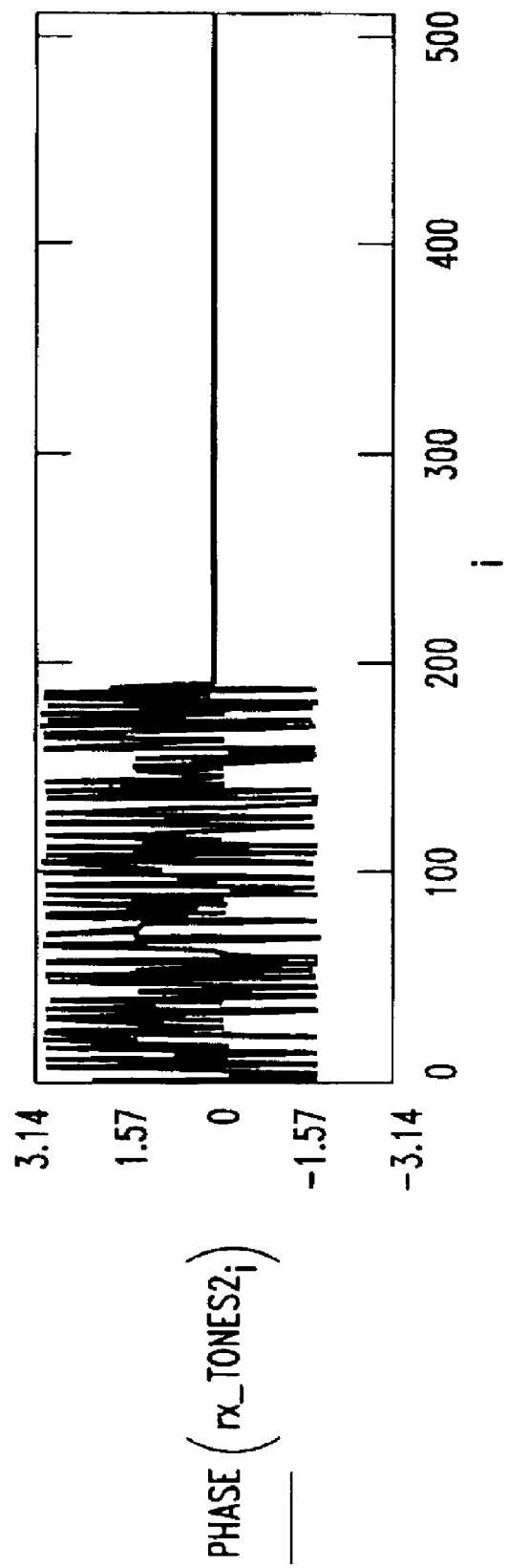
FIG. 8 shows the phase vs. tone number with $\frac{1}{10}^{th}$ tone frequency offset.

Having addressed timing offset, a technique to estimate frequency offset is needed. FIG. 8 shows the OFDM signal phase versus frequency, this time with a frequency offset of $\frac{1}{10}^{th}$ the tone spacing. While the discrete QPSK phase levels are still evident, two effects can be seen: First, all the tones' phases are shifted uniformly on average. Second, there is a slow variation of phase across the OFDM spectrum, giving the appearance that the frequency offset is creating beat frequencies with the individual tones. By averaging across a number of tones, the second effect can be removed, leaving the phase offset on each tone as a predictor of frequency offset. As it was for timing offset, while noise and other impairments may affect individual tone phases, the systematic change in tone phase is present for all tone pairs and can be combined to obtain a robust estimate.

As before, assume that a series of samples, $x_n$, are generated at the transmitter. With a frequency offset of $\Delta f$ the received samples, $r_n$, are:

$$r_n = x_n \cdot e^{j\frac{2\pi \cdot n \cdot \Delta f}{N}}$$

or, combining this with the previous expression for the received tones, $$R_n = \frac{1}{\sqrt{N}} \cdot \sum_{m=0}^{N-1} \left( x_m \cdot e^{j\frac{2\pi \cdot m \cdot \Delta f}{N}} \right) \cdot e^{-j\frac{2\pi \cdot n \cdot m}{N}}$$

As was used for estimating timing offset, frequency offset is similarly estimated by calculating the average phase of the ensemble of the received tones. Again, the $4^{th}$ power signals may be used to remove the modulation. Alternatively, the other techniques described earlier may be employed to estimate the transmitter phase based on known or inferred transmit data. As was the case for timing offset, it is possible to calculate either the phase of the average signal or the average of the phases of the individual signals. For moderate amounts of frequency offset (less than 70% of the tone spacing), either technique works well. In fact, the lower complexity estimate (phase of the mean signal) tolerates larger frequency offsets well—more than 10% of the tone spacing. For typical OFDM systems, frequency offsets and Doppler shifts will generally be a fraction of the tone spacing.

Phase Offset Correction

Finally, it is necessary to consider the effect of phase offset in the channel. The effect of the phase rotation can be expressed as:

$$r_n = x_n \cdot e^{j\Delta\phi}$$

So the received tones are given by:

$$R_n = \frac{1}{\sqrt{N}} \cdot \sum_{m=0}^{N-1} (x_n \cdot e^{j\Delta\phi}) \cdot e^{-j\frac{2\pi \cdot m \cdot n}{N}}$$

The constant rotation factor can be factored out of the summation, indicating that a constant phase rotation of the baseband waveform results in a uniform rotation of each of the transformed tones.

A constant phase offset in the channel gives the same appearance to the received signal constellation that frequency offset produces. By measuring the rotation of the constellation and driving that parameter to zero by modifying the baseband rotator's phase updates, both frequency offset as well as phase rotation of the channel will be compensated for. Actually, in terms of the final signal constellation, the phase rotation caused by frequency and phase offset will not be the limiting factors—a system which uses differential (in time) detection of the signal phase is immune to fixed or (moderate amounts of) changing rotation. The most significant degradation caused by frequency offset is the inter-tone interference caused by the loss of orthogonality, which only requires that the frequency offset be approximated—phase lock is not essential.

VI. Simulation Results

To determine the utility of the timing and frequency offset estimation algorithm, it is necessary to assess its performance in the presence of a variety of channel impairments. In particular, it is necessary to consider how the algorithm behaves in the presence of the following impairments:

White Gaussian noise

Frequency offset while making timing offset estimates delay spread/frequency selective fading.

These impairments were simulated using Mathcad both individually and in various combinations. Results are presented below.

Figure 9:
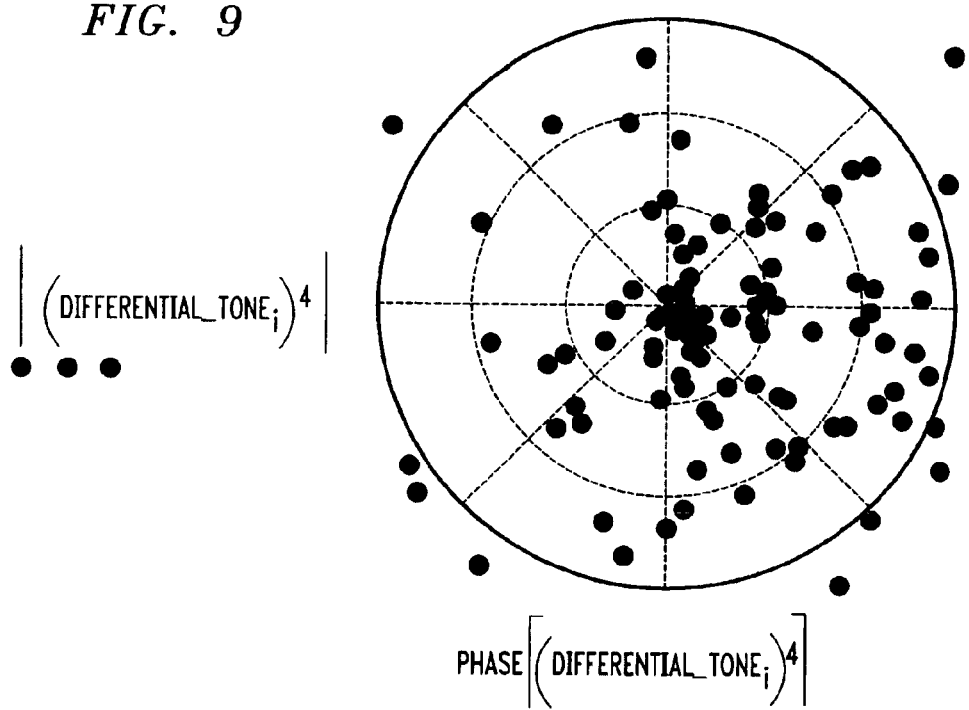
FIG. 9 shows the timing offset constellation with 6 dB SNR and 10 sample timing offset.

First, AWGN was simulated at varying signal to noise ratios. Even when the SNR was 6 dB, giving a $4^{th}$ power differential in frequency constellation as shown in FIG. 9, the timing offset estimator was able to track the timing offset based on one OFDM block. Table I shows some representative timing offset estimates at various SNRs and different timing offsets for the two measures (phase of mean and mean of phase).

TABLE 1

| SNR (dB) | Timing offset (samples) | Mean of Phase Estimate (samples) | Phase of Mean Estimate (samples) |
| --- | --- | --- | --- |
| 6 | 3 | 2.82 | 4.20 |
| 8 | 3 | 3.06 | 4.54 |
| 12 | 3 | 3.07 | 2.84 |
| 20 | 3 | 3.00 | 3.11 |
| 6 | 10 | 8.04 | 9.94 |
| 8 | 10 | 9.45 | 8.06 |
| 12 | 10 | 9.90 | 9.27 |
| 20 | 10 | 10.01 | 10.04 |
| 3 | −22 | −7.30 | −19.20 |
| 8 | −22 | −20.7 | −22.40 |
| 12 | −22 | −22.06 | −21.33 |
| 20 | −22 | −21.96 | −22.00 |
| 6 | $40^5$ | 24.01 | 42.37 |
| 8 | 40 | 20.55 | 39.17 |
| 12 | 40 | 33.92 | 39.64 |
| 20 | 40 | 39.97 | 39.94 |

It can be seen from these AWGN results that, even in the presence of poor SNRs, the algorithm tracks timing offset well, preserving the direction of adjustment and, even in the worst case, preserving the general magnitude of the adjustment needed. Again, it must be noted that these results are for single OFDM block processing. Averaging estimates over successive blocks improves the estimate in the presence of noise. At least in AWGN, simulation results show that the mean of the phase estimate tracks more closely to the actual timing offset than the phase of the mean estimate. While the former estimate is more costly, from a signal processing perspective, with fewer tones' phases differentially compared and with multi-block averaging, it may be preferable to use this method under some circumstances.

Next, it is instructive to look at the effect that frequency offset has on timing offset estimation. As FIG. 8 suggests, frequency offset is unlikely to have much effect on the timing offset estimation. To verify this, the same simulations were conducted as were presented in Table 1, this time with various amounts of frequency offset. Representative results are listed in Table 2.

TABLE 2

| SNR (dB) | Timing offset (samples) | Frequency Offset (fraction of tone spacing) | Mean of Phase Estimate (samples) | Phase of Mean Estimate (samples) |
|---|---|---|---|---|
| 8 | 10 | .1 | 8.89 | 8.04 |
| 8 | 10 | .5 | 7.82 | 9.05 |
| 8 | 10 | 1.0 | 7.01 | 13.86 |
| 20 | −22 | .1 | −22.02 | −21.93 |
| 20 | −22 | .5 | −21.94 | −22.31 |
| 20 | −22 | 1.0 | −18.23 | −23.53 |

Figure 10:
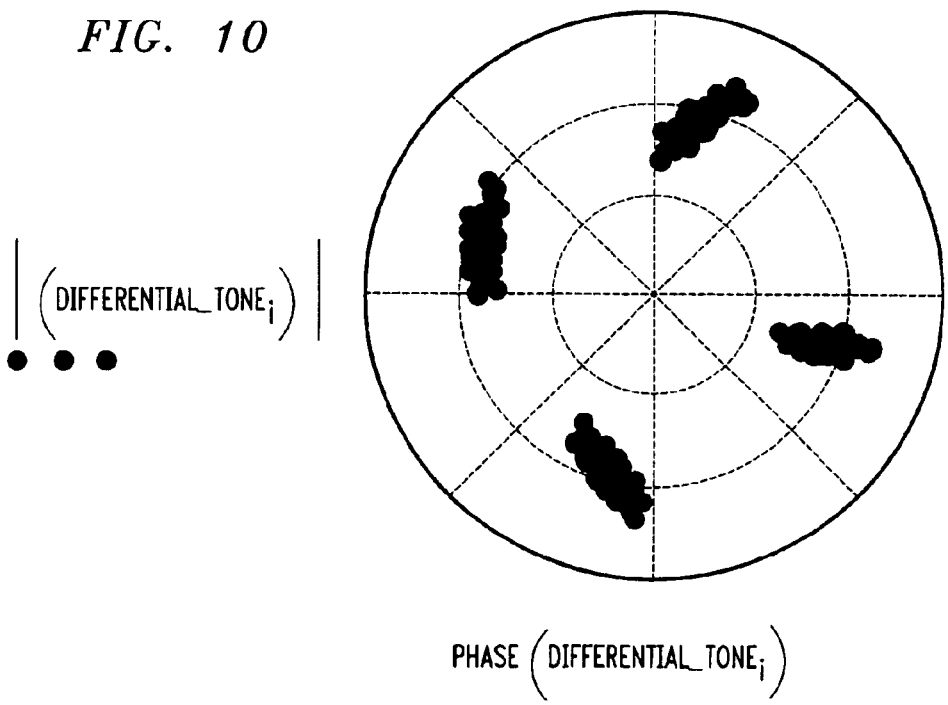
FIG. 10 shows differential in frequency constellation with ½ tone frequency offset and 22 samples timing offset.

While these numbers show the overall performance of the timing offset estimator, it is instructive to examine the signal constellation that the estimator is working with. FIG. 10 shows the effect on the differential in frequency constellation due to a large amount of simultaneous timing and frequency offset. It can be seen that, while the timing offset causes the constellation to "twist," the frequency offset creates a variation in amplitude (due to inter-tone interference) that causes the constellation points to create loci of points originating at (−1,0). In spite of this amplitude variation, the centroids of the twisted constellation points are essentially unchanged.

Finally, simulations of the timing offset estimator were run with delay spread. In one representative experiment, two equal rays with a spacing of 20.8 μsec (46 samples) were generated. With 10 samples of timing offset, it would be expected that the estimator would indicate that 18 samples of correction was needed[1]. With a 10 dB SNR and 0.1 tone frequency offset, the timing offset estimator indicated 15.7 samples for the mean of the phase estimate and 19.8 samples for the phase of the mean estimate. As shown by the real-time DSP results, delay spread has minimal effect on the timing recovery algorithm.

[1] With 10 samples of timing offset in the opposite direction to the 46 samples delay spread, the centroid of the channel response would be (46−10)/2=18 samples from the initial sampling point.

The frequency offset estimator was next tried under simulated channel conditions. It is first worth noting, however, that it is not possible to estimate the frequency offset in the presence of timing offset. Timing offset creates an ever-increasing rotation of the tone signal constellation, making phase measurements meaningless. So, for the remaining simulations, it is assumed that either the timing offset has been adjusted to zero by adjusting the sample clock or the individual tones have been rotated by the proper amount to compensate for the timing offset.

VII. A Physical Interpretation of the Algorithms Performance

We have observed from the above that (1) the noise perturbation of the signal phase does not create a significant problem for timing estimation and (2) the algorithm inherently provides a desirable weighting of timing estimates. These ideas are expanded in this section to provide some intuition about why the timing offset algorithm behaves as well as it does.

Figure 11:
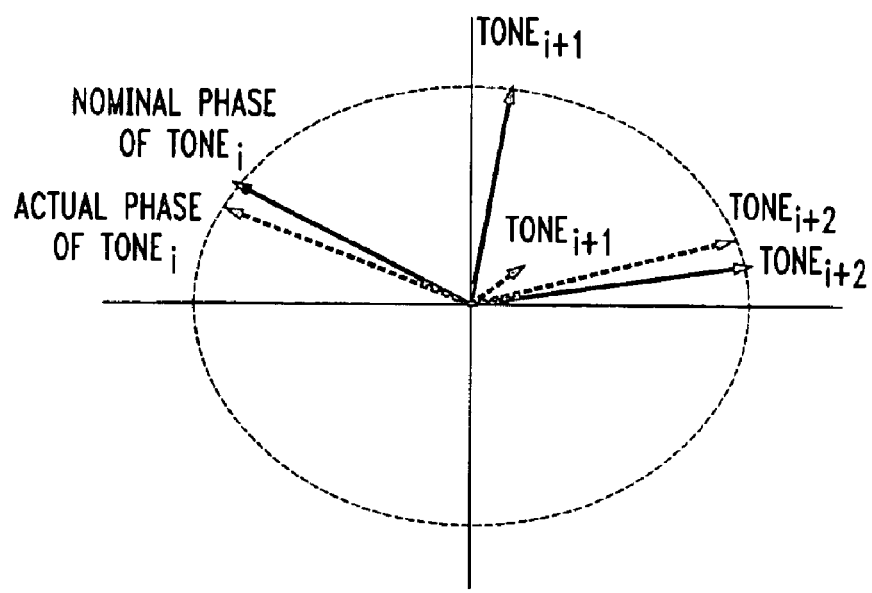
FIG. 11 shows the effect of noise on individual tone phase.

First consider the effect of noise. In FIG. 11, observe an arbitrary set of tone phases. It is assumed that tone and $tone_{i+2}$ provide good estimates of the timing phase, but $tone_{i+1}$ is a noisier signal, giving a poorer estimate of timing phase. Since the tone phases are being differentially compared to determine the overall timing phase estimate, it can be seen that the positive bias in comparing $tone_i$ to $tone_{i+1}$ will tend to cancel the negative bias in comparing $tone_{i+1}$ to $tone_{i+2}$. Thus, as the simulations revealed, good timing estimates can be expected in rather poor SNR conditions. Further, since all of the tone phases have the same systematic bias due to timing offset, the overall timing estimate will magnify this. Meanwhile, although analysis suggests that there is correlation between adjacent noise samples, in combination, the noise correlation across the entire band of frequencies is small and does not seem to disrupt the timing estimate.

The wireless delay dispersive channel that this OFDM system must endure creates frequency selective fading. From this, one might suspect that tones which are in the middle of a frequency null will have poor SNR and cannot be relied on to provide accurate phase estimates to drive the timing algorithm. Worse, the attenuation of one tone generally alters two phase estimates—if $tone_{i+1}$ is near an amplitude null, the phase estimate derived from comparing tones to $tone_{i+1}$ as well as the phase estimate obtained from $tone_{i+1}$ and $tone_{i+2}$ may both be corrupted. Experimental results have shown remarkable performance in the presence of this frequency selective fading. Even when large clusters of tones are suppressed, the timing recovery algorithm performs well. Understanding why this was so provided additional insight into the power of this algorithm.

As shown, each tone is used to estimate the phase of its neighbor. This is done by multiplying the complex conjugate of the first tone with the second tone. This process preserves amplitude information. By collecting the sums of the real and imaginary parts separately, each differential tone pair adds to the phase estimate with an imaginary component proportional to the phase difference and to the amplitude. Further, each differential tone pair contributes to the real component proportionally to the amplitudes of the two tones. Thus, low amplitude, faded, and, probably noisy tones make a much smaller contribution to the overall timing estimate than do high amplitude, most likely clean tones do. The result is that frequency selective fading (i.e., a time dispersive channel) has little effect on the timing estimate. Further, since this algorithm raises the differential signal to the 4 power to remove QPSK modulation, any amplitude differences between tone pairs will be further accentuated.

VIII. Limitations and Practical Considerations

In the preceding description, it has been assumed that all of the OFDM tones would be used to do timing estimation. With 189 active tones, this provides 188 differential phase estimates to be averaged. The signal processing, on a per tone pair basis, is moderate, but cannot be neglected. First, to compute the product of a tone with its neighbor's complex conjugate requires 4 real multiplies and two real adds. Then, to raise this signal to the $4^{th}$ power requires 12 real multiples and 3 adds, so the total number of operations is 16 multiplies and 5 adds. It is likely that this can be improved slightly, but this still will be a moderate amount of signal processing. If all 188 tone pairs are used, the receiver will obviously be in the best position to get a good timing estimate, but it is instructive to see just how few tone pairs were sufficient.

In the presence of noise and other impairments, one tone pair is not sufficient to allow the receiver to properly estimate the proper timing instant. With two or more tone pairs, the noise and interference effects described above are observed. As more and more tones pairs are used, the contribution of each individual tone pair's phase estimate is lessened so any applicable degradation of that estimate is likewise reduced.

In one embodiment of the invention, it is possible to average the phase difference between each tone pair to arrive at an overall phase estimate and then to derive synchronization information from that average phase. In the preferred embodiment of the invention, the real and imaginary components of the differentially detected difference between the tones are each summed to arrive at the real and imaginary parts of an overall correction vector. The phase of this overall correction vector is then calculated, representing the overall synchronization signal. By performing the calculations in this manner a simpler algorithm results, with one arctangent calculation required instead of one arctangent calculation per tone pair.

The resulting invention provides a method for OFDM systems that is capable of separately estimating time and frequency offset in the presence of severe channel impairments, requiring no training sequences or other overhead. The algorithm is capable of deriving high-quality estimates on a single OFDM block or, with lower real-time overhead, could be used to track drift over a series of OFDM blocks.

Various illustrative examples of the invention have been described in detail. In addition, however, many modifications and changes can be made to these examples without departing from the nature and spirit of the invention.

What is claimed is:

1. A receiver system including a front-end stage that develops a plurality of individually modulated carriers, and a following stage, characterized in that:
    said front-end stage receives an incoming signal, develops an offset measure-by developing signals related to said incoming signals and employing a plurality of modulated carriers created from a transformation into frequency domain of said signals related to said incoming signals, which offset measure participates in creating said signals related to said incoming signals.

2. The system of claim 1, where said offset measure is a timing offset, and said processing operates on a plurality of pairs of said modulated carriers from said plurality of modulated carriers, taking account of frequency separation between carriers within each of said pairs.

3. The system of claim 2, where the individually modulated transmission carriers are Orthogonal Frequency Division Multiplexed carriers.

4. The system of claim 2 where said processing on said plurality of pairs develops a set of results, and develops said timing offset from the set of results.

5. The system of claim 4, where carriers of a pair in said pairs are adjacent to each other in the frequency.

6. The system of claim 4, where carriers of a pair in said pairs are equally spaced in the frequency domain, but not adjacent to each other.

7. The system of claim 6 where the processor, in computing the timing offset, computes differences in phase between said received carriers.

8. The system of claim 4, where carriers of a pair in said pairs are not equally spaced in the frequency domain.

9. The system of claim 4 where said timing offset between any pair of modulated carriers is developed by raising the complex representation of the modulated carriers to an integer power.

10. The system of claim 9 where the carriers are modulated by an N-level phase modulation scheme, and the carriers are raised to the $N^{th}$ power.

11. The system of claim 10 where the modulation is Quadrature Phase Shift Keying and the carriers are raised to the fourth power.

12. The system of claim 1 where said offset measure is a frequency offset that is developed by computing phases of said plurality of modulated carriers.

13. The system of claim 1 where the plurality of modulated carries are used in combination to determine said offset measure with the contribution of each carrier weighted according to its accuracy.

14. The system of claim 13 where the accuracy of each carrier's contribution is determined based on the carrier's amplitude.

15. The system of claim 14 where, for each carrier, the carrier's amplitude and phase, represented by a complex number in a Cartesian coordinate system, is summed with the other carriers' complex representation to yield a composite vector, representing the composite amplitude and phase; said processor further employing the phase of this composite vector to create a frequency synchronization signal.

16. The system of claim 15 where the carriers' modulating data signals are known by the receivers and can be used to determine the precise transmitter carriers' phases.

17. The system of claim 15 where the carriers' modulating data signals are not known by the receivers but can be estimated by attempting to demodulate the carriers and then used to estimate the transmit carriers' phases.

18. The system of claim 15 where the carriers' modulating data signals are not known by the receivers but where the effect of the modulation can be removed from the carriers without demodulating the carriers.

19. The system of claim 18 where the means to remove the carriers' data modulation is by raising the complex representation of the carrier amplitude and phase to an integer power.

20. The system of claim 19 where the modulation of the carriers is by N level phase modulation and the data modulation is removed by raising the complex representation of the carrier amplitude and phase to the $N^{th}$ power.

21. The system of claim 20 where the modulation is a Quadrature Phase Shift Keying and the data modulation is removed by raising the complex representation of the carrier amplitude and phase to the fourth power.

* * * * *